(12) United States Patent
Tsai et al.

(10) Patent No.: US 8,419,265 B2
(45) Date of Patent: Apr. 16, 2013

(54) BACKLIGHT MODULE

(75) Inventors: Chia-Hsun Tsai, Hsin-Chu (TW);
Chen-Ming Chiu, Hsin-Chu (TW);
Kuo-Lian Yeh, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/371,589

(22) Filed: Feb. 13, 2012

(65) Prior Publication Data
US 2012/0140445 A1 Jun. 7, 2012

Related U.S. Application Data

(63) Continuation of application No. 12/275,476, filed on Nov. 21, 2008, now abandoned.

(30) Foreign Application Priority Data

Sep. 23, 2008 (TW) ................................ 97136493 A

(51) Int. Cl.
*F21V 7/04* (2006.01)

(52) U.S. Cl.
USPC ......................................... 362/634; 362/632

(58) Field of Classification Search ........... 362/632–634
See application file for complete search history.

(56) References Cited

U.S. PATENT DOCUMENTS

| 6,124,906 A | 9/2000 | Kawada et al. |
| 7,178,967 B2 * | 2/2007 | Kim ............................. 362/633 |
| 7,319,499 B2 | 1/2008 | Peng |
| 7,374,325 B2 | 5/2008 | Ko |
| 7,572,047 B2 | 8/2009 | Kim |
| 2001/0003471 A1 | 6/2001 | Lee et al. |
| 2002/0075667 A1 | 6/2002 | Kawashima et al. |
| 2004/0062029 A1 | 4/2004 | Ato |
| 2005/0078469 A1 * | 4/2005 | Jeong ............................. 362/31 |

(Continued)

FOREIGN PATENT DOCUMENTS

| CN | 1818756 | 8/2006 |
| CN | 1955808 | 7/2008 |

(Continued)

OTHER PUBLICATIONS

English language translation of abstract and pertinent parts of CN 101226302 A.

(Continued)

*Primary Examiner* — Julie Shallenberger
(74) *Attorney, Agent, or Firm* — McClure, Qualey & Rodack, LLP

(57) ABSTRACT

A backlight module includes a front frame, a backboard, and a light source. The front frame and the backboard define opposite outermost surfaces of the backlight module. The backboard includes a frame and a light-shield plate. The frame is coupled with the front frame. The frame has a plurality of plates surroundingly defining an empty part and at least one side wall extending from one of the plates to be coupled with the front frame. Each one of the plates has a first surface, a second surface opposite to the first surface, and at least one rib and/or trough, and the rib and/or trough is disposed on the first surface and is spaced apart from the side wall. The light-shield plate covers the empty part. The light source is disposed between the front frame and the backboard.

20 Claims, 5 Drawing Sheets

U.S. PATENT DOCUMENTS

| | | |
|---|---|---|
| 2005/0094039 A1 | 5/2005 | Kim et al. |
| 2005/0141245 A1 | 6/2005 | Sugahara et al. |
| 2005/0280750 A1 | 12/2005 | Cho et al. |
| 2006/0007708 A1* | 1/2006 | Lee .............................. 362/632 |
| 2006/0044837 A1 | 3/2006 | Lee |
| 2006/0221632 A1* | 10/2006 | Hsu .............................. 362/604 |
| 2007/0091644 A1 | 4/2007 | Fujishima |

FOREIGN PATENT DOCUMENTS

| | | |
|---|---|---|
| CN | 101226302 A | 7/2008 |
| CN | 201081178 | 7/2008 |
| TW | 200401143 A | 1/2004 |
| TW | M260081 | 3/2005 |
| TW | I232337 | 5/2005 |
| TW | M285187 | 1/2006 |
| TW | I255954 | 6/2006 |
| TW | I270026 | 1/2007 |
| TW | M306016 | 2/2007 |
| TW | I275881 | 3/2007 |
| TW | 97108161 | 3/2008 |
| TW | 200925715 A | 6/2009 |

OTHER PUBLICATIONS

English translation of abstract and pertinent parts of TW 200925715 A.
English translation of abstract and pertinent parts of TW 200401143 A.
English language translation of abstract and pertinent parts of CN 1818756 (published Aug. 16, 2006).
English language translation of abstract of CN 1955808 (published May 2, 2007).
English language translation of abstract of CN 201081178 (published Jul. 2, 2008).
English language translation of abstract of TW I270026.
English language translation of abstract of TW 97108161.
English language translation of abstract of TW M285187.
English language translation of abstract of TW M260081.
English language translation of abstract of TW M306016.
English language translation of abstract of TW I255954.
English language translation of abstract of TW I275881.
English language translation of abstract of TW I232337.

* cited by examiner

BACKLIGHT MODULE

RELATED APPLICATIONS

The present application is a continuation of application Ser. No. 12/275,476 filed Nov. 21, 2008, entitled "BACKBOARD OF THE BACKLIGHT MODULE", currently pending; which claims priority to Taiwan Patent Application Serial Number 97136493, filed Sep. 23, 2008. All of these applications are incorporated herein by reference.

BACKGROUND

1. Field of Invention

The present invention relates to a backboard. More particularly, the present invention relates to a backboard adapted on the backside of a backlight module.

2. Description of Related Art

Display technology becomes one of the most important technologies in the world now. Besides the visual part of the display technology, the weight of the display is also an important concern. A more light-weighted device is desirable. However, the backboard of the display is often made by a piece of thick metal board connecting to the front frame. The thick metal board is heavy and costly.

Accordingly, what is needed is a backboard structure that results in lower weight and lower cost without affecting the supporting mechanism to overcome the above issues. The present invention addresses such a need.

SUMMARY

According to one embodiment of the present invention, a backlight module includes a front frame, a backboard, and a light source. The front frame and the backboard define opposite outermost surfaces of the backlight module. The backboard includes a frame and a light-shield plate. The frame is coupled with the front frame. The frame has a plurality of plates surroundingly defining an empty part and at least one side wall extending from one of the plates to be coupled with the front frame. Each one of the plates has a first surface, a second surface opposite to the first surface, and at least one rib. The rib is disposed on the first surface, protrudes from the first surface, and is spaced apart from the side wall. The light-shield plate covers the empty part. The light source is disposed between the front frame and the backboard.

According to another embodiment of the present invention, a backlight module includes a front frame, a backboard, and a light source. The front frame and the backboard define opposite outermost surfaces of the backlight module. The backboard includes a frame and a light-shield plate. The frame is coupled with the front frame. The frame has a plurality of plates surroundingly defining an empty part and at least one side wall extending from the one of the plates to be coupled with the front frame. Each one of plates has a first surface, a second surface opposite to the first surface, and at least one trough. The trough is disposed in the first surface, is punched into the first surface, and is spaced apart from the side wall. The light-shield plate covers the empty part. The light source is disposed between the front frame and the backboard.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
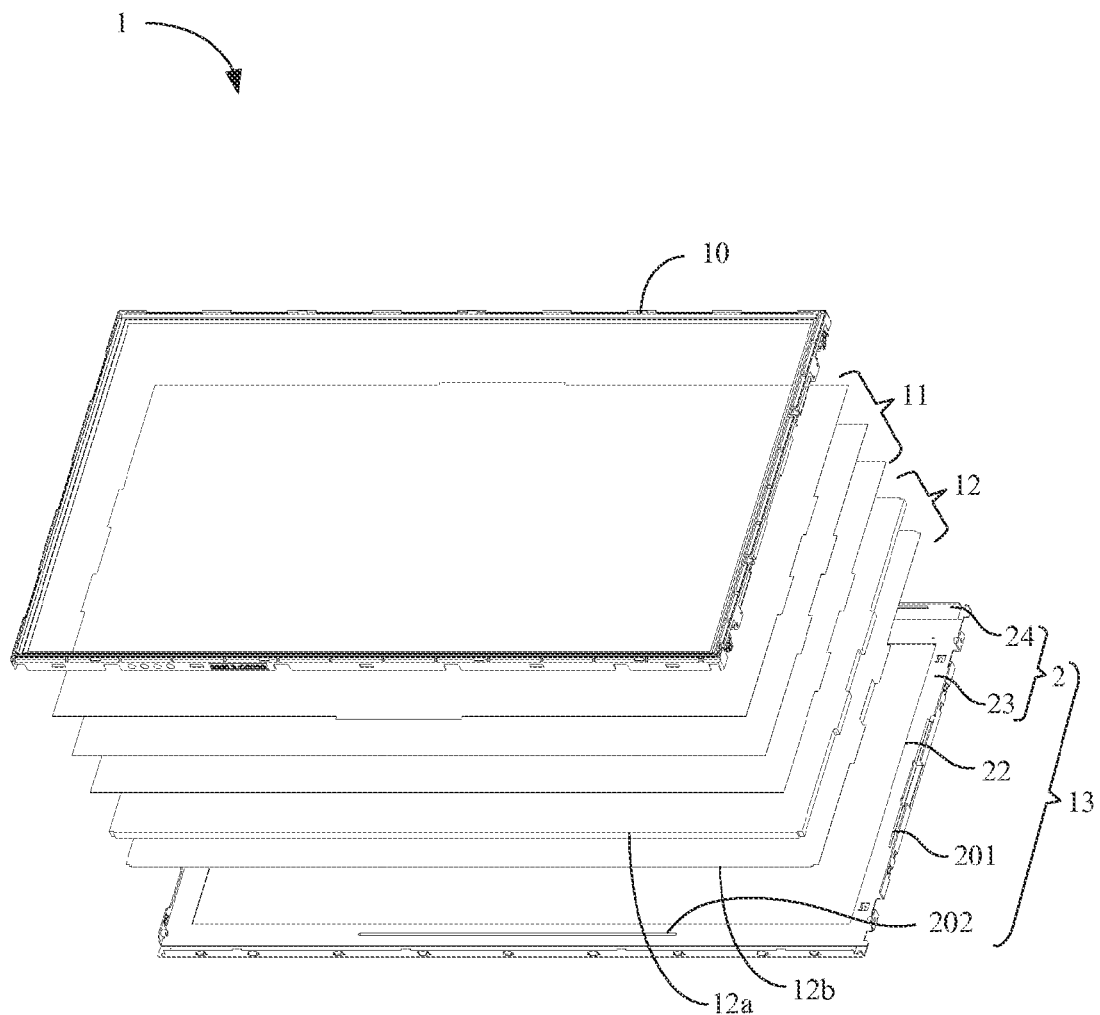
FIG. 1 is a backlight module of the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

Please refer to FIG. 1, a backlight module 1 of the first embodiment of the present invention. The backlight module 1 comprises a front frame 10, a group of optical films 11, a light source structure 12 and a backboard 13. The front frame 10 is placed on a front side of the backlight module 1 and is connected to the backboard 13. The light source structure 12 substantially comprises a light source (not shown), a light guide plate 12a and a reflector 12b, etc. The group of optical films 11 is placed on the light source structure 12, wherein the group of optical films 11 and the light source structure 12 are both fixed in an inner space (not shown) formed between the front frame 10 and the backboard 13.

Figure 2A:
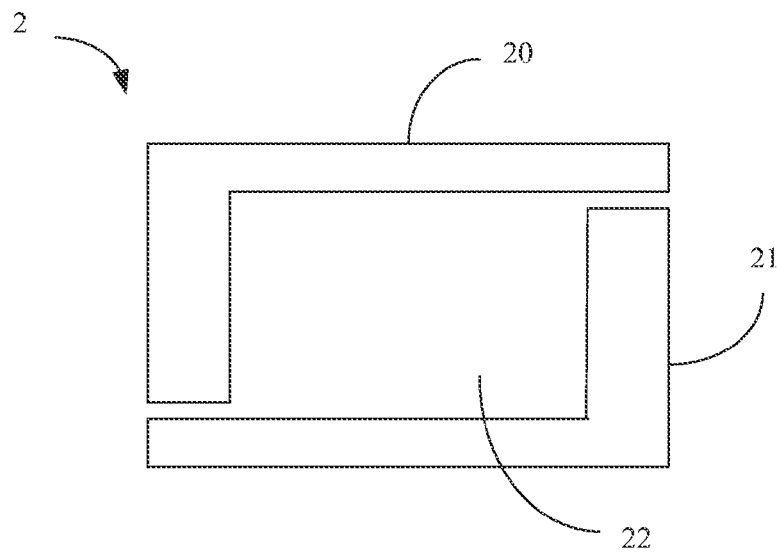
FIG. 2A is a diagram of the rear frame of the first embodiment of the present invention.
Figure 2B:
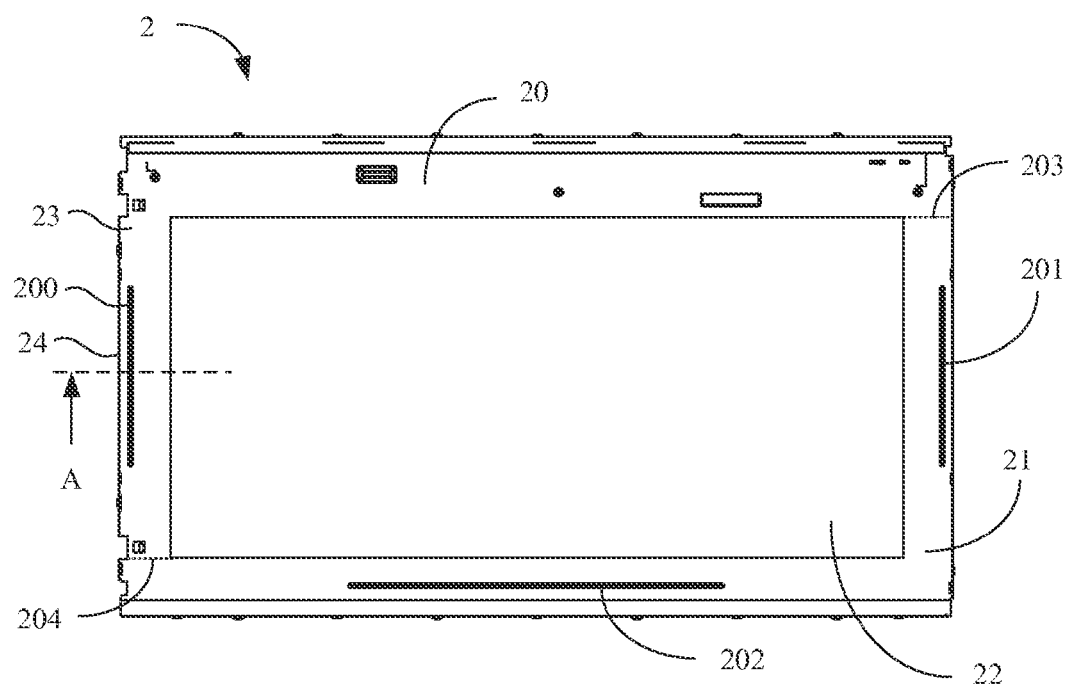
FIG. 2B is a top view of the rear frame of the first embodiment of the present invention.
Figure 2C:
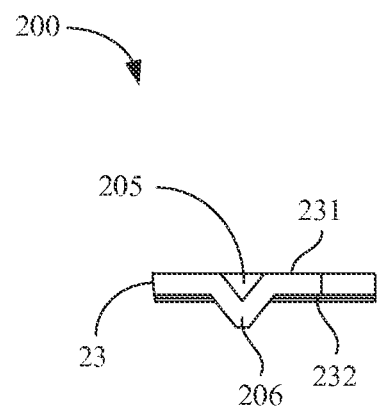
FIG. 2C is a cross-sectional view of the support means along the A direction in FIG. 2B of an embodiment of the present invention.
Figure 2D:
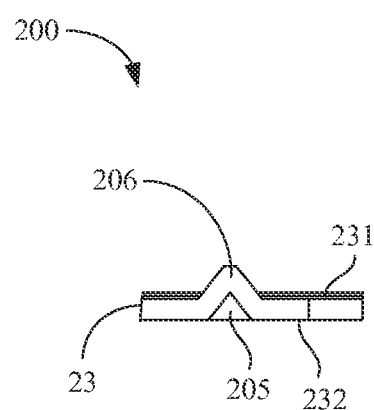
FIG. 2D is a cross-sectional view of the support means along the A direction in FIG. 2B of another embodiment of the present invention.

The backboard 13 comprises a rear frame 2. The rear frame 2 has a plurality of plates 23 surroundingly defining an empty part 22 and at least one side wall 24 extending from one of the plates 23 to be coupled with the front frame 10. FIG. 2A is a diagram of the rear frame 2 of the first embodiment of the present invention. In the present embodiment, the rear frame 2 comprises 2 L-shaped frame members 20 and 21 adapted to each other. Therefore, the empty central part 22 is formed between the frame members 20 and 21. The frame members 20 and 21 are made of metal material in the present embodiment. As shown in FIG. 2B, a top view of the rear frame 2 of the first embodiment of the present invention, the support means 200, 201 and 202 are further formed on the rear frame 2, wherein the support means 200 is formed on the L-shaped frame member 20, and the support means 201, 202 are formed on the L-shaped frame member 21. The two L-shaped frame member 20 and 21 may be welded together to form the rear frame 2, thus two welding lines 203 and 204 are formed between the frame members 20 and 21. The structure of the support means 200, 201 and 202 is as depicted in FIG. 2C, which is a cross-sectional view of the support means 200 along the A direction in FIG. 2B. The plate 23 has a first surface 231 and a second surface 232 opposite to the first surface 231. The support means 200 has at least one trough 205. The trough 205 is disposed in the first surface 231, is punched into the first surface 231, and is spaced apart from the side wall 24. The support means 200 further has at least one rib 206 disposed on a portion of the second surface 232 which is opposite to a portion of the first surface 231 where the trough 205 is disposed. In another embodiment, the support means 200 has at least one rib 206 as depicted in FIG. 2D. The rib 206 is disposed on the first surface 231, protrudes from the first surface 231, and is spaced apart from the side wall 24. The support means 200 further has at least one trough 205 disposed in a portion of the second surface 232 which is opposite to a portion of the first surface 231 where the rib 206 is disposed. Both of the structures reinforce the supporting mechanism of the rear frame. The number of support means can be different in other embodiments.

Figure 3A:
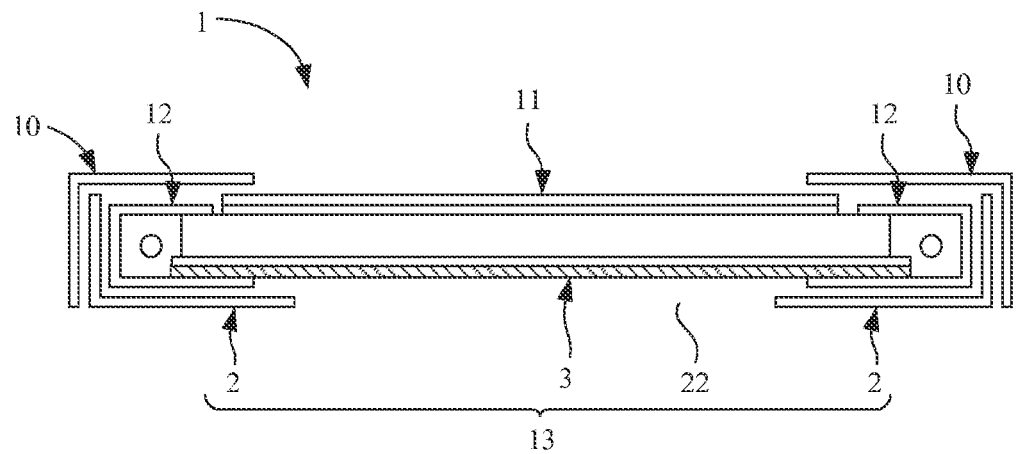
FIG. 3A, FIG. 3B and FIG. 3C are cross-sectional views of the backlight module of an embodiment of the present invention respectively.
Figure 3B:
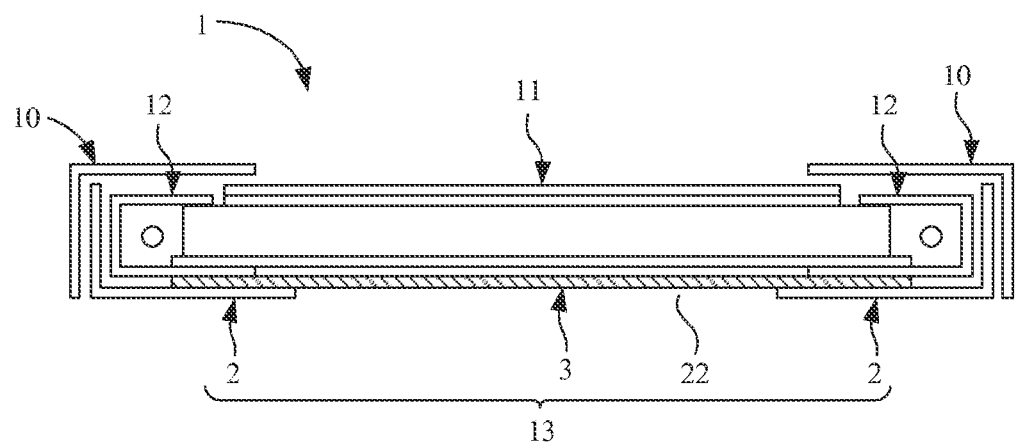
Figure 3C:
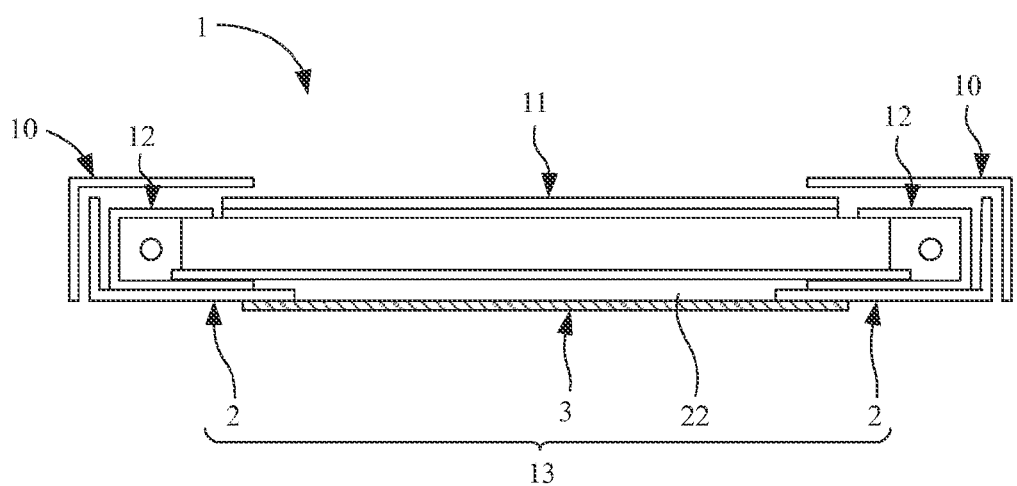

The backboard 13 further comprises a light-shield plate 3 covering the empty central part 22 of the rear frame 2. The light-shield plate 3 can be a plastic film or metal foil in different embodiments. The backboard 13 comprising the light-weighted light-shield plate 3 and the rear frame 2 with empty central part 22 is far lighter than a backboard made by a thick heavy metal board. Further, the light-shield plate 3 costs less as compared to the metal board. The metal foil type of the light-shield plate 3 with high thermal conductivity not only blocks the light from the light source structure 12 but also provides a great heat-dissipating mechanism. The position of the light-shield plate 3 can vary in different embodiments. In FIG. 3A, a cross-sectional view of the backlight module 1, the light-shield plate 3 is connected to an inner side of the light source structure 12. In another embodiment as depicted in FIG. 3B, the light-shield plate 3 is connected between an outer side of the light source structure 12 and an inner side of the rear frame 2. In yet another embodiment, the light-shield plate is connected to an outer side of the rear frame 2. No matter in which embodiment described above, the light shield plate 3 can cover the empty central part 22 of the rear frame 2 to block the light from the light source structure 12.

Figure 4A:
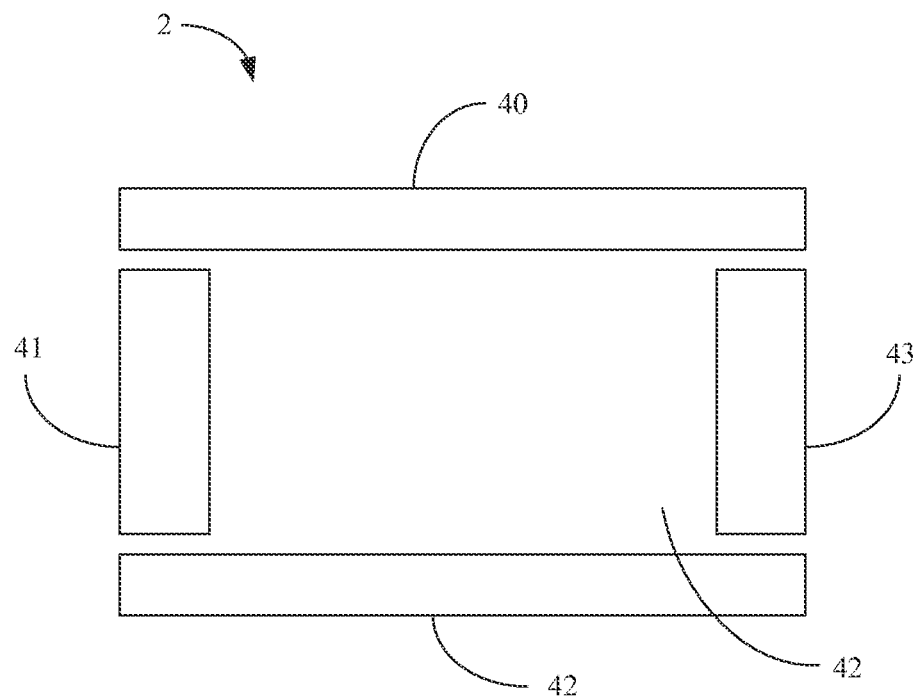
FIG. 4A is a diagram of the rear frame of another embodiment of the present invention.
Figure 4B:
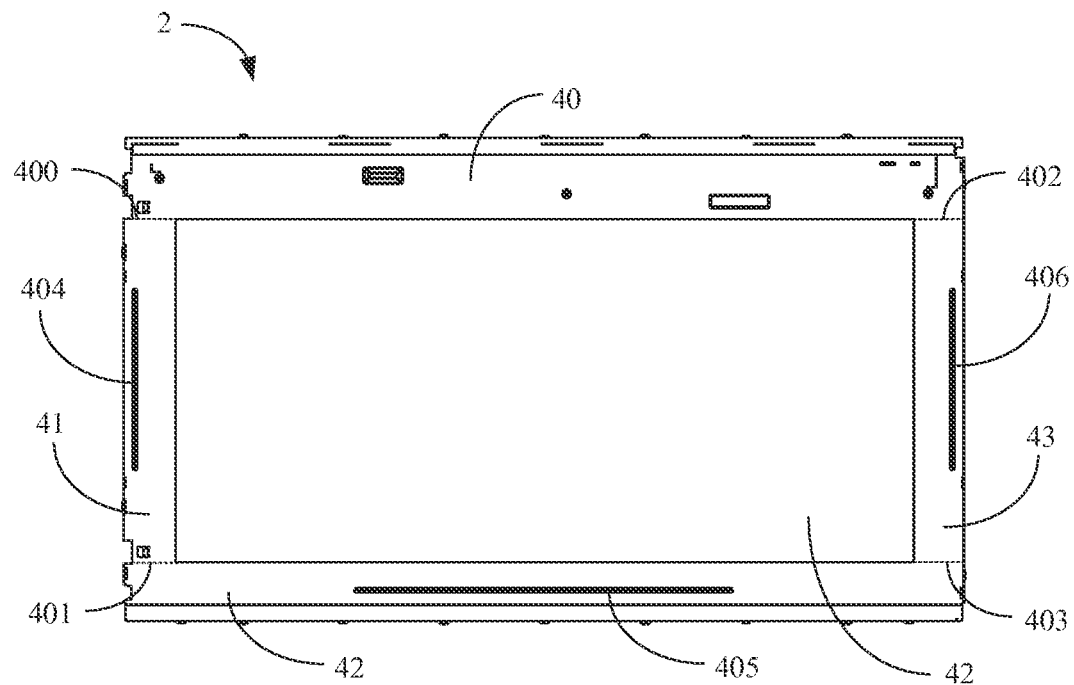
FIG. 4B is a top view of the rear frame of another embodiment of the present invention.

In another embodiment, the rear frame 2 comprises four bar-shaped frame members 40-43 adapted to each other as depicted in FIG. 4A and FIG. 4B. Also, the frame members 40-43 can be welded together to form the rear frame 2, thus there are four welding lines 400-403 between each two neighboring frame members, and an empty central part 42 is formed in the center of the four frame members 40-43. Support means 404, 405, 406 are formed on the frame members 41, 42 and 43 respectively to provide a supporting mechanism. Yet in another embodiment, the rear frame 2 can be one-piece formed.

The backboard of the present invention comprises a rear frame and a light-shield plate that lower the weight and the cost. The support means on the rear frame further reinforce the supporting mechanism of the rear frame, and the light-shield plate provides the light-shielding and heat-dissipating mechanism.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a front frame;
   a backboard, wherein the front frame and the backboard define opposite outermost surfaces of the backlight module, the backboard comprising:
   a frame coupled with the front frame, the frame having a plurality of plates surroundingly defining an empty part and at least one side wall extending from one of the plates to be coupled with the front frame, wherein each one of the plates has a first surface, a second surface opposite to the first surface, at least one rib, and at least one trough, the rib is disposed on the first surface, the rib protrudes from the first surface, the rib is spaced apart from the side wall, the trough is disposed in a portion of the second surface which is opposite to a portion of the first surface where the rib is disposed, and a bottom of the trough is located at a different level from the level of the other portions of the second surface other than the portion of the second surface where the trough is disposed; and
   a light-shield plate covering the empty part; and
   a light source disposed between the front frame and the backboard.

2. The backlight module of claim 1, wherein both of the rib and the side wall are physically connected to the same first surface, but the rib and the side wall are separated.

3. The backlight module of claim 1, wherein the frame comprises two L-shaped frame members adapted to each other.

4. The backlight module of claim 1, wherein the frame comprises four bar-shaped frame members adapted to each other.

5. The backlight module of claim 1, wherein the rib is formed on one of the plates longitudinally for reinforcing a supporting mechanism of the frame.

6. The backlight module of claim 5, wherein the length of the rib is shorter than the length of one of the plates of the frame.

7. The backlight module of claim 6, wherein the rib is disposed at a middle portion of one of the plates of the frame.

8. The backlight module of claim 1, wherein the light-shield plate is connected to an inner side of the frame.

9. The backlight module of claim 1, wherein the light-shield plate is connected to an outer side of the frame.

10. The backlight module of claim 1, wherein the light-shield plate is connected between an outer side of the light source and an inner side of the frame.

11. The backlight module of claim 1, further comprising an optical film disposed between the front frame and the backboard.

12. The backlight module of claim 1, further comprising at least one reflector disposed between the light source and the backboard.

13. A backlight module, comprising:
   a front frame;
   a backboard, wherein the front frame and the backboard define opposite outermost surfaces of the backlight module, the backboard comprising:
   a frame coupled with the front frame, the frame having a plurality of plates surroundingly defining an empty part and at least one side wall extending from one of the plates to be coupled with the front frame, wherein each one of the plates has a first surface, a second surface opposite to the first surface, at least one trough, and at least one rib, the trough is disposed in a portion of the first surface, the trough is punched into the portion of the first surface, the trough is spaced apart from the side wall, a bottom of the trough is located at a different level from the level of the other portions of the first surface other than the portion of the first surface where the trough is disposed, the rib protrudes from the second surface, and the rib is spaced apart from the side wall; and
   a light-shield plate covering the empty part; and a light source disposed between the front frame and the backboard.

14. The backlight module of claim 13, wherein the rib is disposed on a portion of the second surface which is opposite to the portion of the first surface where the trough is disposed.

15. The backlight module of claim 13, wherein the side wall and the rib are physically connected to the first surface and the second surface of the same one of the plates, respectively, but the rib and the side wall are separated.

16. The backlight module of claim 13, wherein the length of the rib is shorter than the length of one of the plates of the frame.

17. The backlight module of claim 13, wherein the frame comprises two L-shaped frame members adapted to each other.

18. The backlight module of claim 13, wherein the frame comprises four bar-shaped frame members adapted to each other.

19. The backlight module of claim 13, further comprising an optical film disposed between the front frame and the backboard.

20. The backlight module of claim 13, further comprising at least one reflector disposed between the light source and the backboard.

* * * * *